Oct. 12, 1965   A. L. CLEAVER ETAL   3,210,878
SEMI-AUTOMATIC MISSILE LAUNCHER
Filed April 2, 1964   13 Sheets-Sheet 1
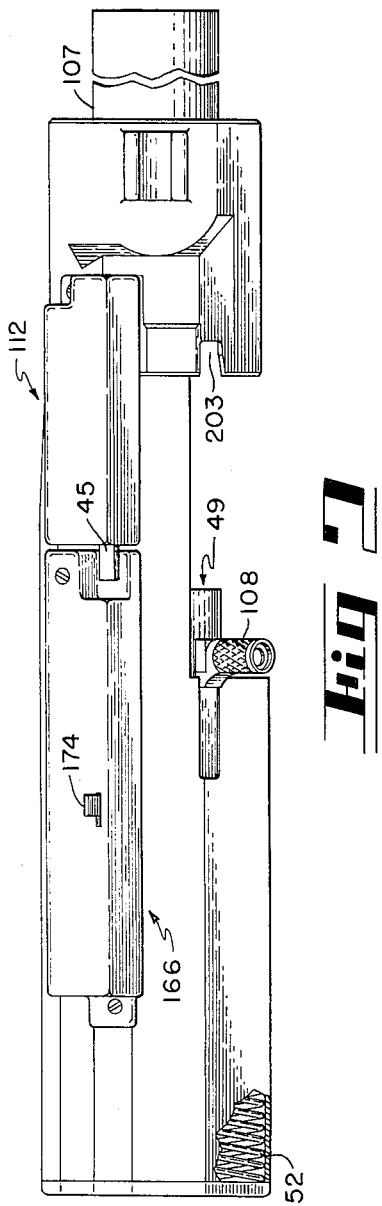
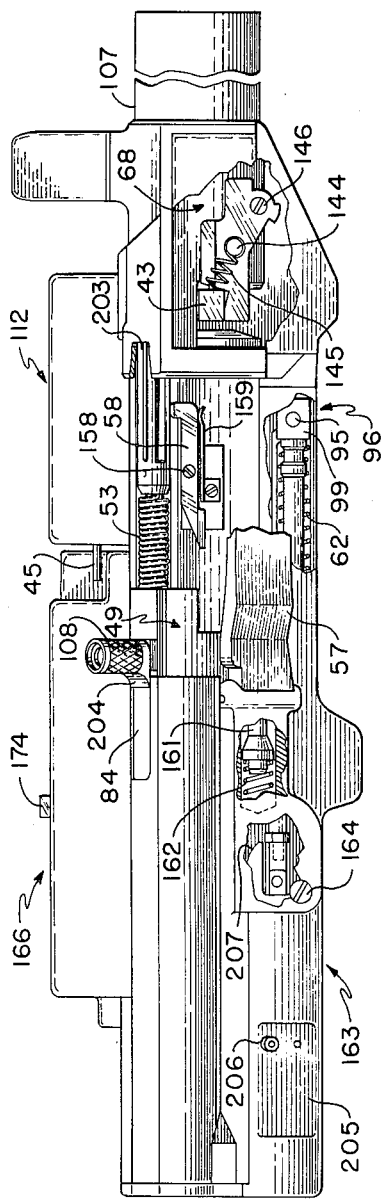
INVENTORS.
ALBERT L. CLEAVER
ROY F. RANGE
BY KENNETH J. J. McGOWAN
ATTORNEYS.

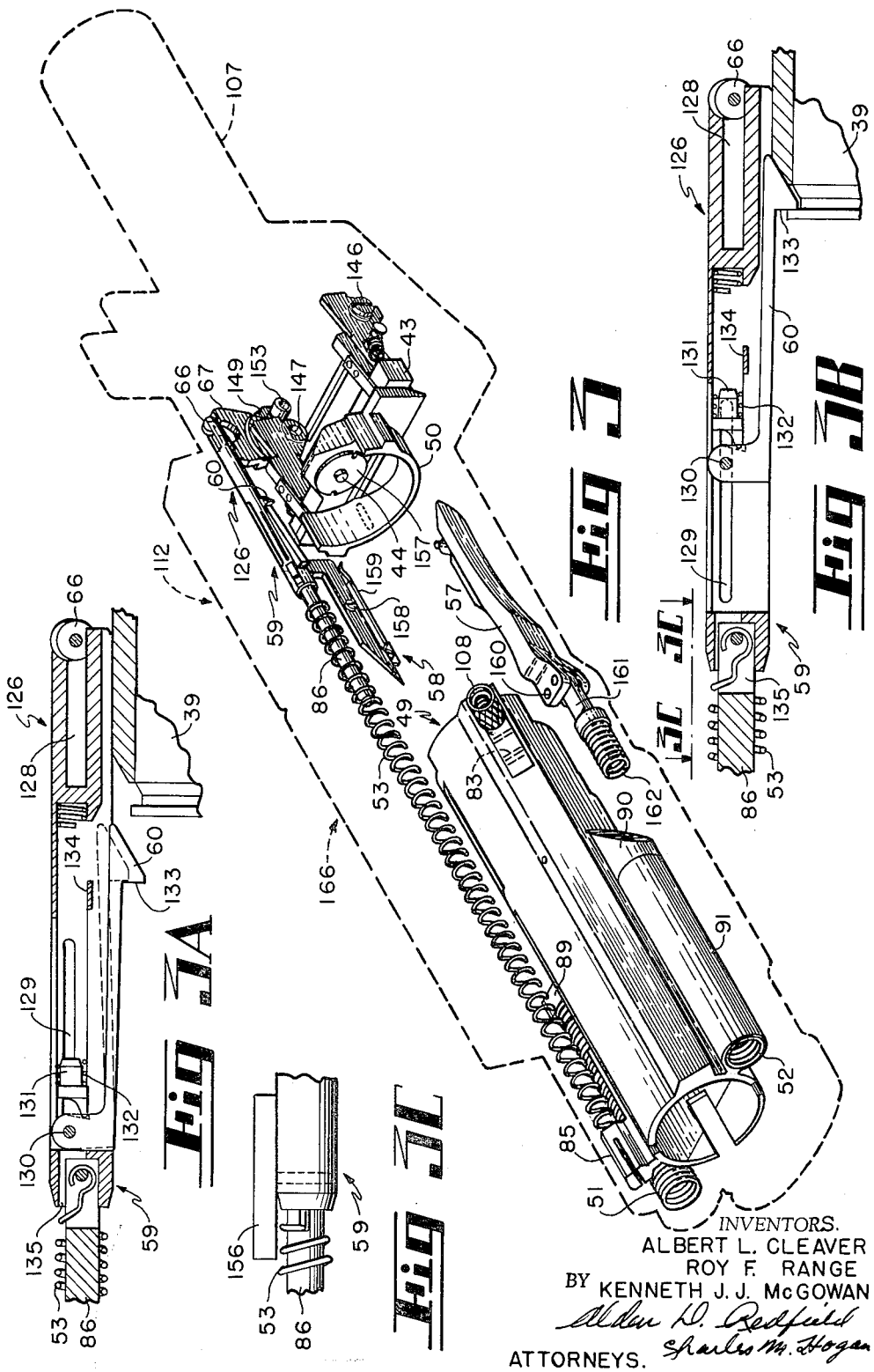

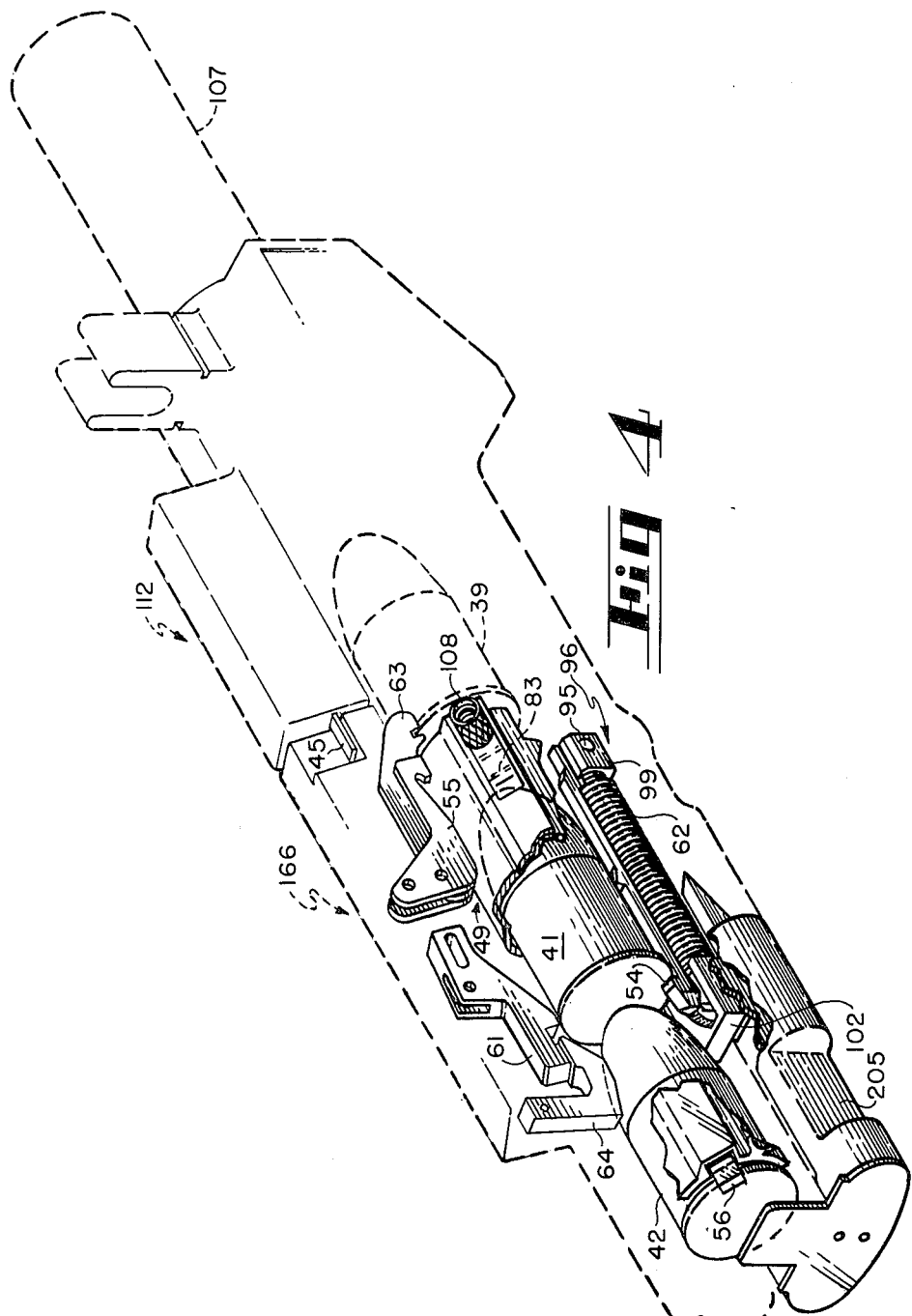

Oct. 12, 1965   A. L. CLEAVER ETAL   3,210,878
SEMI-AUTOMATIC MISSILE LAUNCHER
Filed April 2, 1964   13 Sheets-Sheet 4
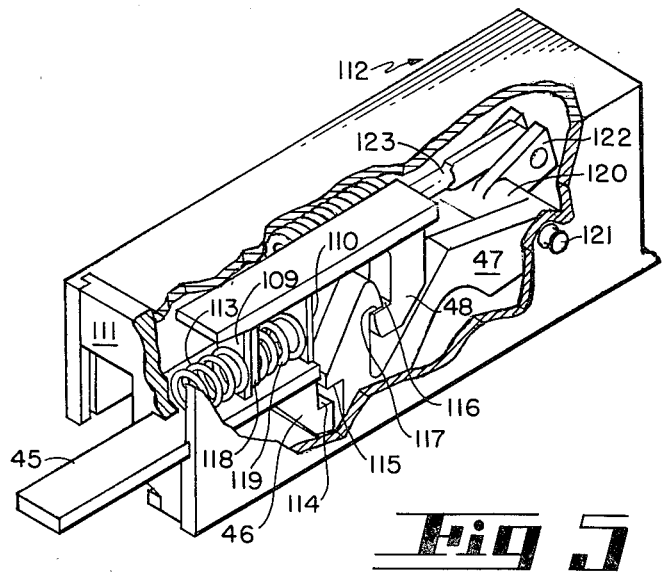
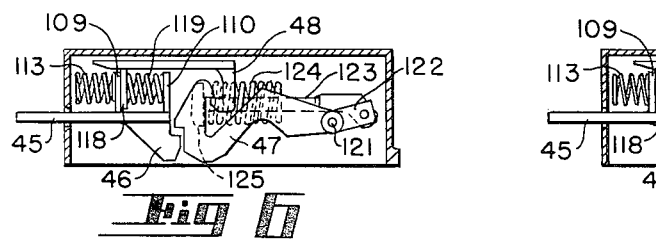
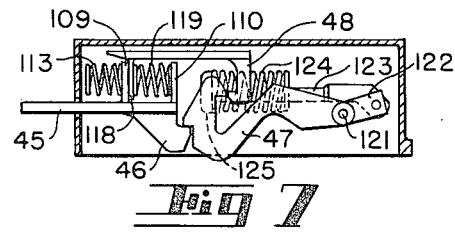
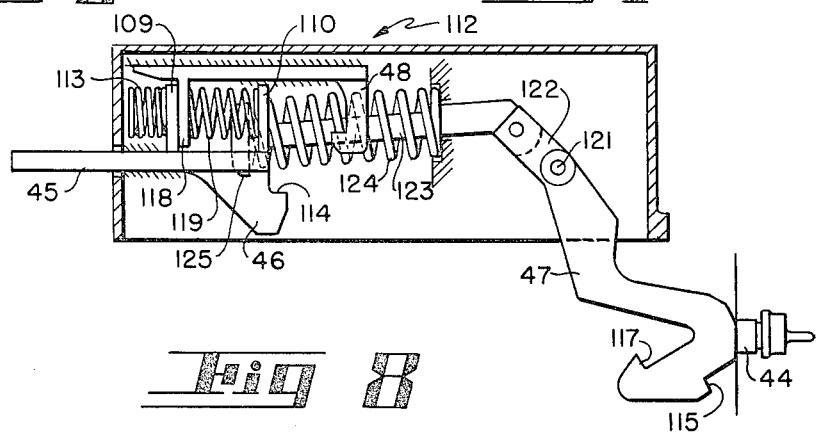
INVENTORS.
ALBERT L. CLEAVER
ROY F. RANGE
BY KENNETH J.J. McGOWAN
ATTORNEYS.

Oct. 12, 1965    A. L. CLEAVER ETAL    3,210,878
SEMI-AUTOMATIC MISSILE LAUNCHER
Filed April 2, 1964    13 Sheets-Sheet 5

INVENTORS.
ALBERT L. CLEAVER
ROY F. RANGE
BY KENNETH J. J. McGOWAN

ATTORNEYS.

INVENTORS.
ALBERT L. CLEAVER
ROY F. RANGE
BY KENNETH J.J. McGOWAN

ATTORNEYS.

Oct. 12, 1965  A. L. CLEAVER ETAL  3,210,878
SEMI-AUTOMATIC MISSILE LAUNCHER
Filed April 2, 1964  13 Sheets-Sheet 7

INVENTORS.
ALBERT L. CLEAVER
ROY F. RANGE
BY KENNETH J. J. McGOWAN
ATTORNEYS.

Oct. 12, 1965    A. L. CLEAVER ETAL    3,210,878
SEMI-AUTOMATIC MISSILE LAUNCHER

Filed April 2, 1964    13 Sheets-Sheet 8

INVENTORS.
ALBERT L. CLEAVER
ROY F. RANGE
BY KENNETH J.J. McGOWAN

ATTORNEYS.

Oct. 12, 1965  A. L. CLEAVER ETAL  3,210,878
SEMI-AUTOMATIC MISSILE LAUNCHER
Filed April 2, 1964  13 Sheets-Sheet 9
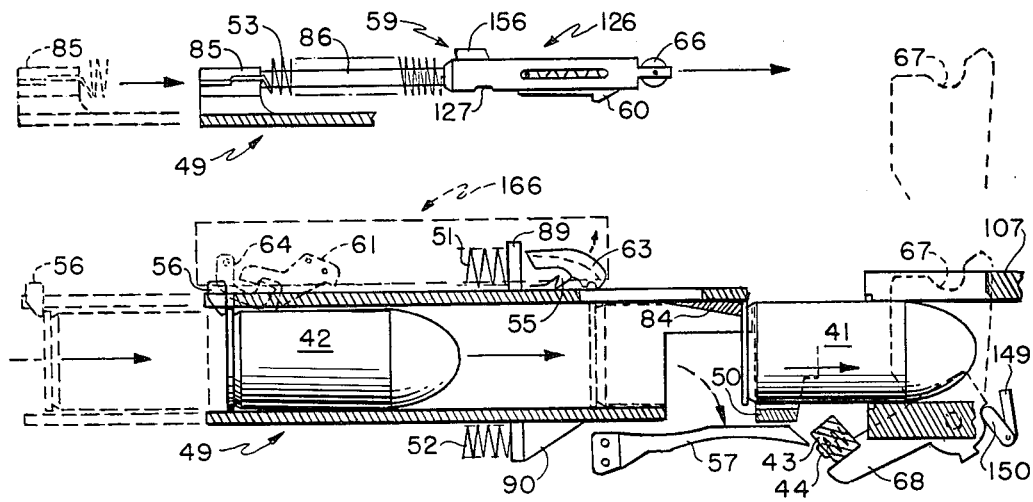
Fig 17
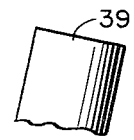
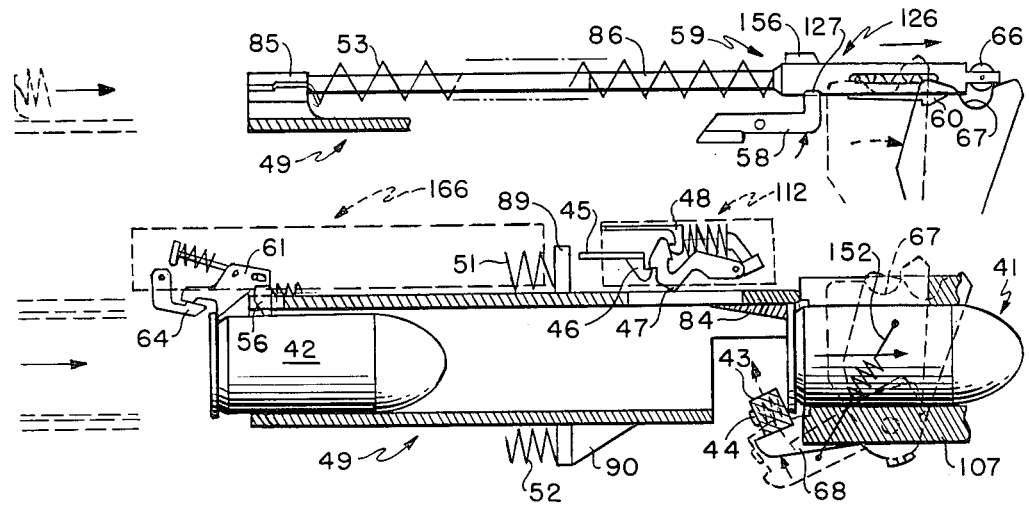
Fig 18
INVENTORS.
ALBERT L. CLEAVER
ROY F. RANGE
BY KENNETH J.J. McGOWAN
ATTORNEYS.

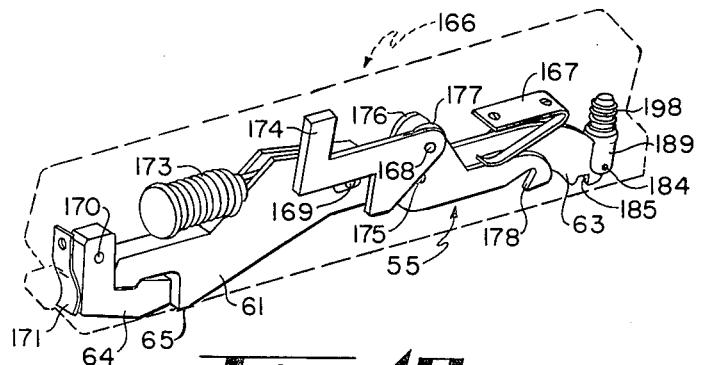
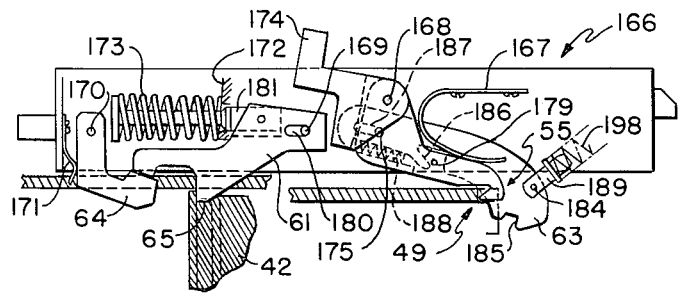
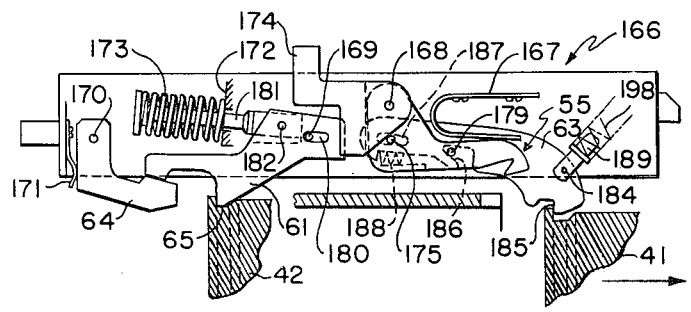

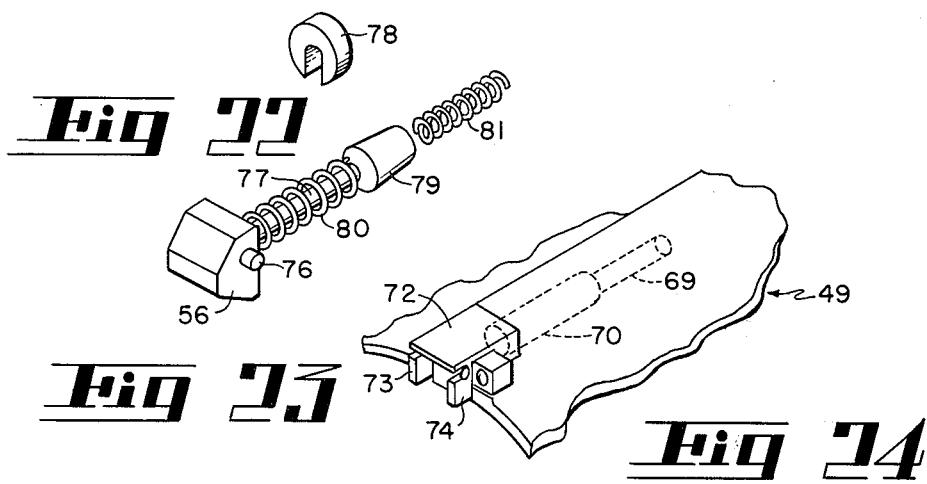
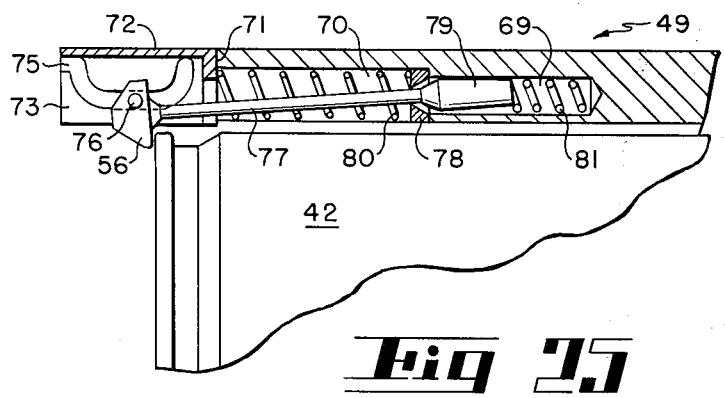
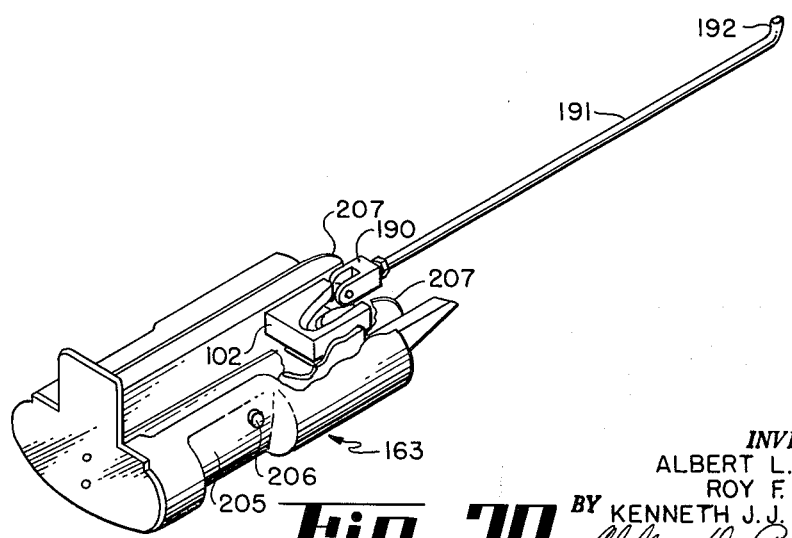

INVENTORS.
ALBERT L. CLEAVER
ROY F. RANGE
KENNETH J. J. McGOWAN
BY
ATTORNEYS.

Oct. 12, 1965  A. L. CLEAVER ETAL  3,210,878
SEMI-AUTOMATIC MISSILE LAUNCHER
Filed April 2, 1964  13 Sheets-Sheet 13
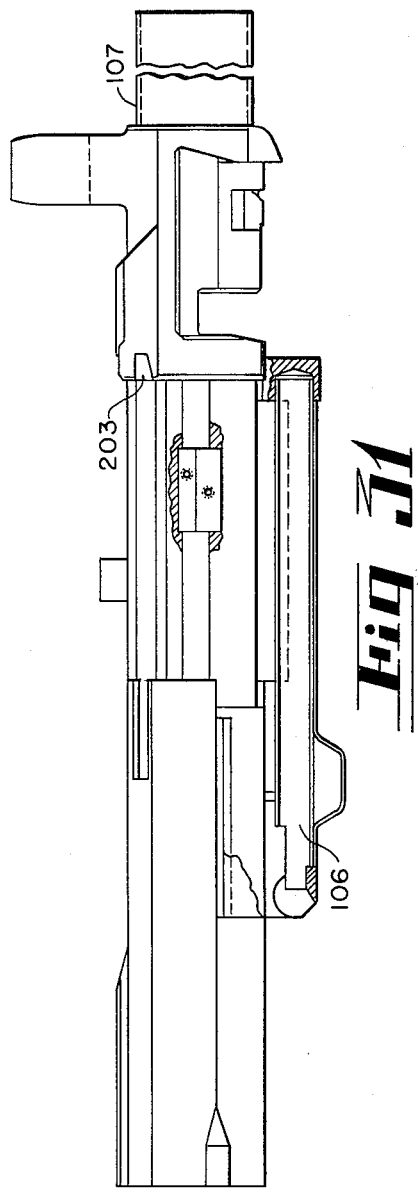
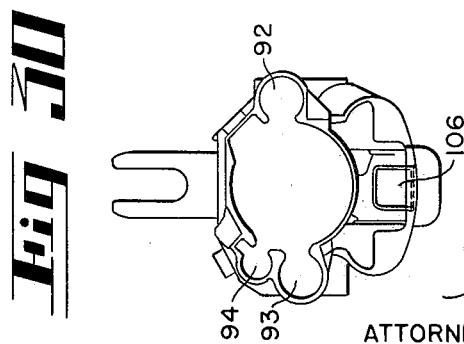
INVENTORS.
ALBERT L. CLEAVER
ROY F. RANGE
BY KENNETH J. J. McGOWAN
ATTORNEYS.

United States Patent Office 3,210,878
Patented Oct. 12, 1965

3,210,878
SEMI-AUTOMATIC MISSILE LAUNCHER
Albert L. Cleaver, Roy F. Range, and Kenneth J. J. McGowan, Richmond, Ind., assignors to Avco Corporation, Richmond, Ind., a corporation of Delaware
Filed Apr. 2, 1964, Ser. No. 356,808
37 Claims. (Cl. 42—17)

The present invention is directed generally to ordnance, and it resides in the field of semi-automatic weapons. The invention provides a novel semi-automatically fired tactical weapon. In the embodiment herein shown, 40 millimeter ammunition is used by way of illustration.

The present invention, a controlled impulse, in-line launcher, is unique in several features, particularly that whereby the rounds are fed in tandem through a hollow bolt directly into the chamber. This feature is provided in order to keep weight to a minimum, to maintain a low silhouette, and to transfere the ammunition with a minimum of enegry and impacts.

According to another novel feature, a tension spring is used to drive the cam rod and extractor. This feature keeps the case of a fired cartridge locked in the breech until the round clears the muzzle, lowers the energy requirement of the cam lock, and reduces the gun-length dimension requirements compared to those of weapons using a compression spring.

Conventional practice in hand-carried weapons of the semi-automatic type is to provide a magazine separate from the housed bore of the gun, and, by displacement offset from the bore axis, to transfer one cartridge or case-type missile at a time from the magazine into the firing chamber. This type of weapon has been found satisfactory when small ammunition is employed, but is not adapted to design for use with large caliber ammunition. The present invention dispenses with an offset magazine and makes possible radically increased fire power for the infantryman. Indeed, it provides a new order of ratio to fire power per pound of weapon weight.

Objects of the present invention (not enumerated in the precise order of emphasis) are to provide:

(1) A light-weight, portable, rapid-fire tactical weapon;

(2) A weapon which is particularly light in weight, considering its fire power;

(3) A weapon which tandem-loads a plurality of ammunition rounds from positions directly behind and coextensive with the line of fire—i.e., concentric with the barrel of the weapon;

(4) Means for progressive transfer and tandem feed of that ammunition into the firing chamber;

(5) In combination with the means mentioned above, reliable cartridge case ejection;

(6) A weapon which is extremely simple in construction and is further characterized by these desirable attributes: low silhouette, reduced recoil, safety, ease of loading and unloading, and ready adaptation to any kind of mounting or to shoulder firing.

In accordance with the invention, a weapon of the type having a firing station and an intermediate station and a rear station is improved. The improvement comprises a combination of several elements, the first of which is a reciprocally movable bolt having a round traversal pasage therethrough. The bolt 49 is illustrated in FIGS. 1, 2, 3, 4, 11–18, and 26–28.

Another element of the combination is means positioned by retraction of the bolt for providing a driving force which, when not restrained, drives a round from the intermediate station through said bolt. This means comprises a round feed latch 54 and a feed spring 62, best shown in FIGS. 4, 11–16, and 26–28.

The third element is round-advancing means carried by the bolt and positioned by further retraction of the bolt for advancing a round forwardly from the rear station to the intermediate station when the bolt advances. The round-advancing means comprises a round-advance pawl 56, best shown in FIG. 12–18, 23, and 25.

The fourth element of the combination is releasable bolt-locking means for locking the bolt in fully retracted position. This means comprises a bolt latch 55, as shown in FIGS. 4, 12–17, and 19–21.

The fifth element of the novel combination is round-restraining means for restraining the first-mentioned round at the intermediate station. This round-restraining means is generally referred to herein as the "decel latch" 61, best shown in the performance of its restraining function in FIG. 14. (See also FIGS. 11–13 and 15–21.)

The sixth element is means for releasing the round-restraining means 61 to permit the means 62 to drive a round forwardly from the intermediate position through the bolt. The releasing means is a cam rod subassembly generally designated by the reference numeral 59, as best shown in FIGS. 3, 3A, 3B, 3C, 9, and 11–15, particularly FIG. 15. That is, a formation on the operating rod strikes the decel latch to permit a round to be moved from the intermediate position into battery position.

The bolt-locking means 55 is so aranged and the round contour is such that the round's being driven forwardly unlocks the bolt as it emerges from the bolt (see FIG. 16), whereupon the bolt chambers the round which was just moved out of the intermediate position and advances the lagging round from the rear station to the intermediate station (these actions being illustrated in FIGS. 16–18).

The combination just described is only one of the several inventive combinations and subcombinations herein disclosed, and it is chosen for purposes of illustration.

For a better understanding of the present invention, together with other objects, advantages, and capabilities thereof, reference is made to the appended drawings, in which there is illustrated a preferred embodiment of missile launcher in accordance with the invention.

Description of the drawings

In the drawings:

FIG. 1 is a side elevational view of the novel weapon in accordance with the invention, showing the right side of the gun, with certain parts broken away for clarity in exposition;

FIG. 2 is a top plan view of the weapon;

FIG. 3 is a perspective view showing certain of the major impulse or spring-operated parts in their relationship to each other, with emphasis being directed to the locking bar, the ejection gate, the cam rod and spring, the cam lock, and the bolt;

FIG. 3A is an axial sectional view of the cam rod subassembly showing the general arrangement of the parts;

FIG. 3B is an axial sectional view showing the cam rod subassembly as the subassembly, with the exception of the extractor, has moved rearwardly to a position appropriate for the beginning of extraction;

FIG. 3C is a fragmentary perspective view of certain portions of the cam rod subassembly;

FIG. 4 is a perspective view showing generally the major feeding and locking parts of the weapon in their relationship to each other, with emphasis devoted to the bolt, the feeding and locking mechanisms, and the tandem positions of the rounds of ammunition at the intermediate and rear stations;

FIG. 5 is a perspective view of the trigger, hammer, and sear mechanism, shown in hammer-upper sear engagement position with parts of the housing broken away for clarity in exposition;

FIGS. 6, 7 and 8 are side elevational views of the trigger and sear mechanism during the following phases of operation, respectively: hammer on upper sear, hammer in firing position on lower sear, hammer released for firing;

FIGS. 11 through 18 are diagrammatic illustrations showing the major parts in various positional relationships corresponding to successive phases of operation of the gun during a typical firing cycle, FIG. 11 representing the ready-to-fire Round No. 1-conditions, and FIG. 18 representing the Round No. 2-being fully chambered condition;

FIG. 19 is a perspective view of the contents of the decelerator housing, comprising the decel latch and the bolt latch and the round latch;

FIGS. 20 and 21 are side views of the FIG. 19 mechanism showing, respectively, the conditions which exist when the bolt is locked substantially in its retracted position and the conditions which prevail in another phase of operation when the bolt has been unlocked and is beginning to move forward toward battery position;

FIGS. 22, 23, and 24 are perspective views, respectively, of the round advance retainer, the round advance feed latch for Round No. 3, and a fragment of the bolt;

FIG. 25 is a cross-sectional view through the bolt, showing the bolt feed latch for Round No. 3 and its relationship to that round;

FIG. 29 is a perspective view of the safing rod and certain parts of the loader;

FIG. 30 is a rear end view of the housing illustrated in FIG. 31; and

FIG. 31 is a side elevational view of the housing of a weapon in accordance with the invention.

*Cycle of operation*

Figure 11:
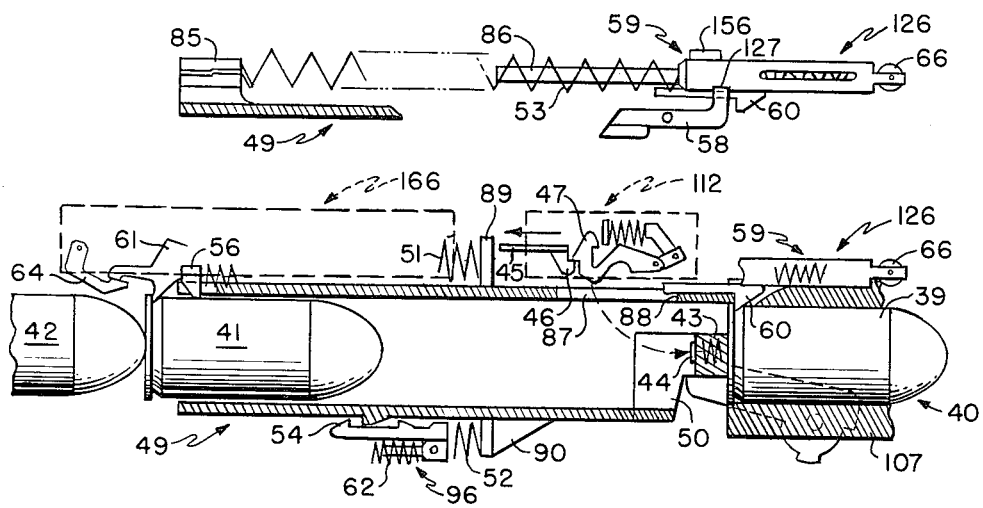

The following description at this point of a cycle of operation will facilitate understanding of the construction of the novel weapon herein disclosed. The assumed conditions are as follows:

First, the round at the first station, designated by the expression "Round No. 1," or by the reference numeral 40, is in the firing chamber (FIG. 11);

Second, the round 41 at the intermediate station, called "Round No. 2," is in position behind round 40 and is being held by the decel latch 61;

Third, the round 42 at the rear station, Round No. 3, is in position behind Round No. 2;

Fourth, locking bar 43 is behind the base of the case 39 of Round No. 1;

Fifth, impact sleeve 50 is in its forward position;

Sixth, bolt 49 is in battery position, resting against impact sleeve 50;

Seventh, hammer 47 is engaged by lower sear 46; and

Eighth, extractor 60 is engaging the base of case 39 of Round No. 1.

These conditions are illustrated in FIG. 11.

The cycle of operation is as follows:

First, the trigger bar 45 is pulled rearwardly (FIGS. 7 and 11), disengaging the hammer 47 from the lower sear 46, so that the hammer swings downwardly and outwardly and impacts the firing pin 44 for percussive firing of round 40 in battery (FIG. 8).

Second, by reason of the force of the recoiling cartridge case 39, the locking bar 43 (FIG. 12) is impelled rearwardly and impacts sleeve 50 and bolt 49, whereby the bolt is driven rearwardly. The impact occurs after the bar 43 has moved approximately 0.15 inch.

Figure 12:
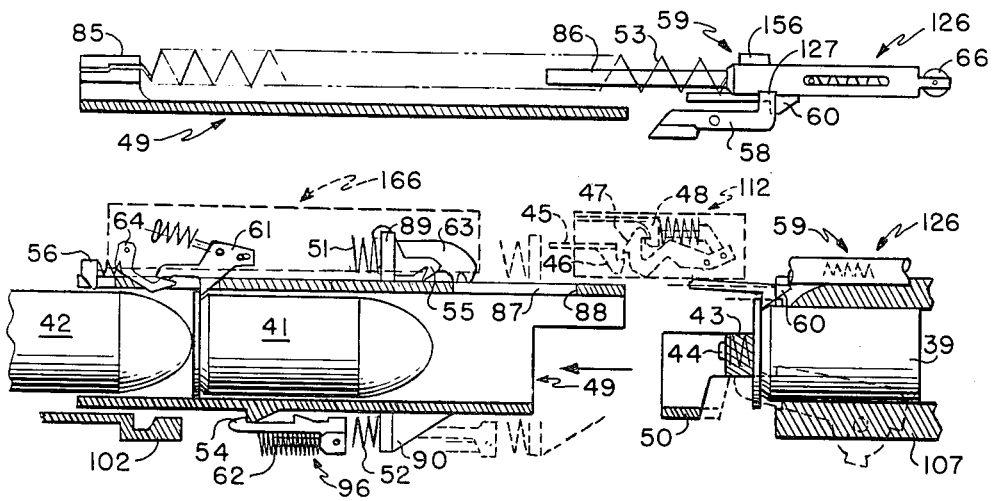

Third, as the bolt 49 retracts, the front top edge of a cut-out portion o fthe bolt, through which portion the hammer passed when firing, cams the hammer and resets the hammer, turning it clockwise to engage the upper sear 48 (FIGS. 12 and 6). Parenthetically, when the trigger bar 45 is released, it moves forwardly and the hammer then engages the lower sear 46 (FIG. 7).

Fourth, the bolt 49 compresses or loads two main springs 51 and 52 (FIG. 12), the function of which is to store up energy by compression and later to return the bolt to battery. During this phase of operation the bolt also stresses a tension spring 53 in order to store up energy for operation of the cam rod subassembly 59.

Figure 13:
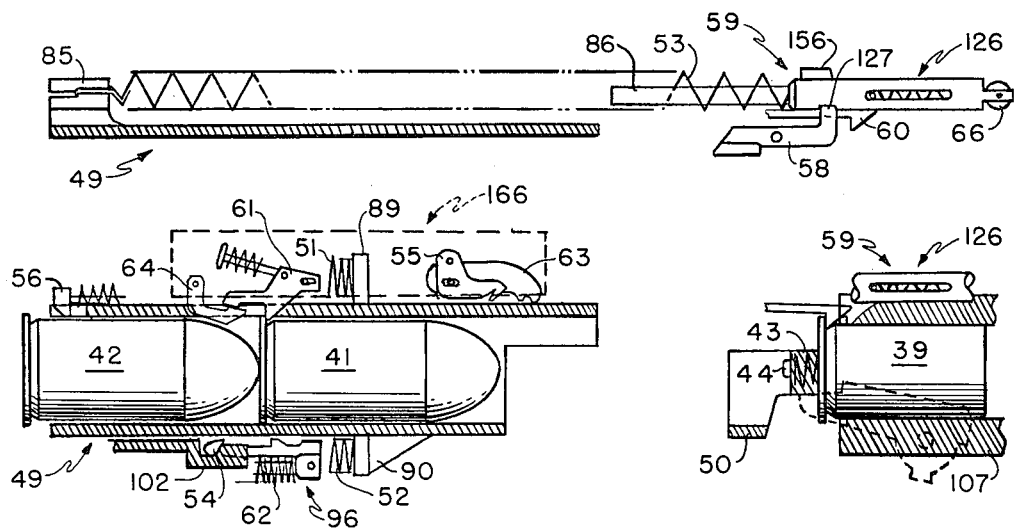
Figure 14:
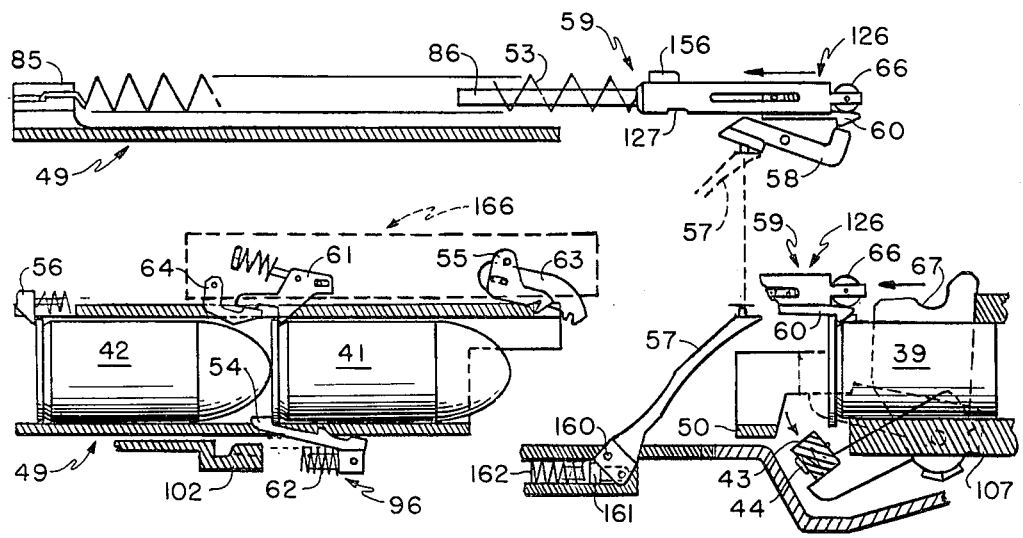
Figure 27:
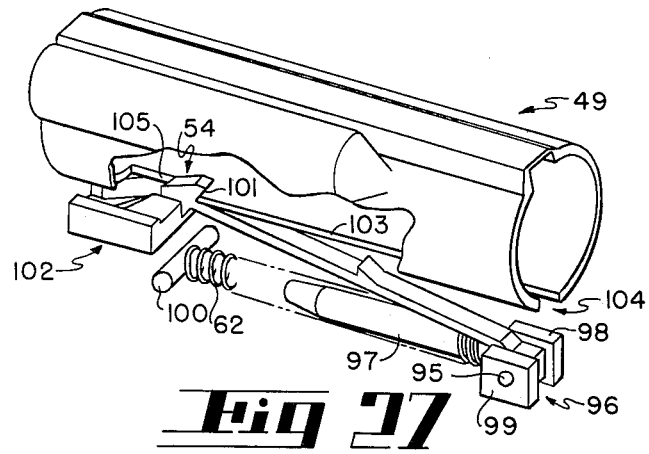
Figure 28:
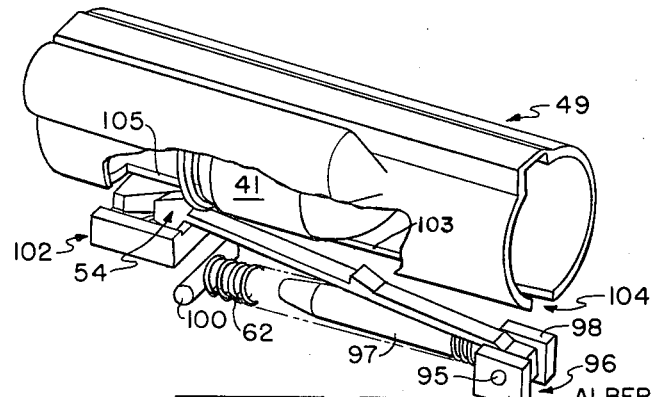

Fifth, after the bolt 49 has traveled approximately 1.5 inches the bolt picks up the sliding round feed latch 54 (FIGS. 12, 13, and 26) and rearwardly pulls (FIGS. 14 and 27) and moves that latch to such a position that it engages the base of the case of round 41 at the intermediate station, and then the bolt continues to retract, leaving round feed latch 54 behind round 41 (FIGS. 14 and 28). By the time the latch 54 is placed behind round 41, the feed latch spring 62 has been compressed or loaded approximately 4.2 inches by the movement of the bolt. Round No. 2—i.e., the element 41 at the intermediate station—remains in a locked position because it is engaged by the decel latch 61.

Sixth, as the bolt clears the extractor gate 57, that gate (FIGS. 14 and 15) swings inwardly—i.e., across the discharge opening for expended cases—and frees the cam rod 59 by striking the cam lock 58, thereby starting a sequence of events actuated by cam-rod retraction (i.e., controlled by the cam rod 59).

Seventh, the bolt 49 impacts on a rear plate and is finally latched in its rearmost position by the bolt latch 55 (FIG. 14), and a bolt advance pawl 56 on the rear of the bolt is slipped over the base of the round 42 in the rear station (i.e., Round No. 3). This concludes the events directly controlled by bolt-retraction. At this phase of the cycle it will be noted that latches 54 and 56 engage rounds 41 and 42, respectively. Decel latch 61 remains in engagement with the base of round 41.

Figure 15:
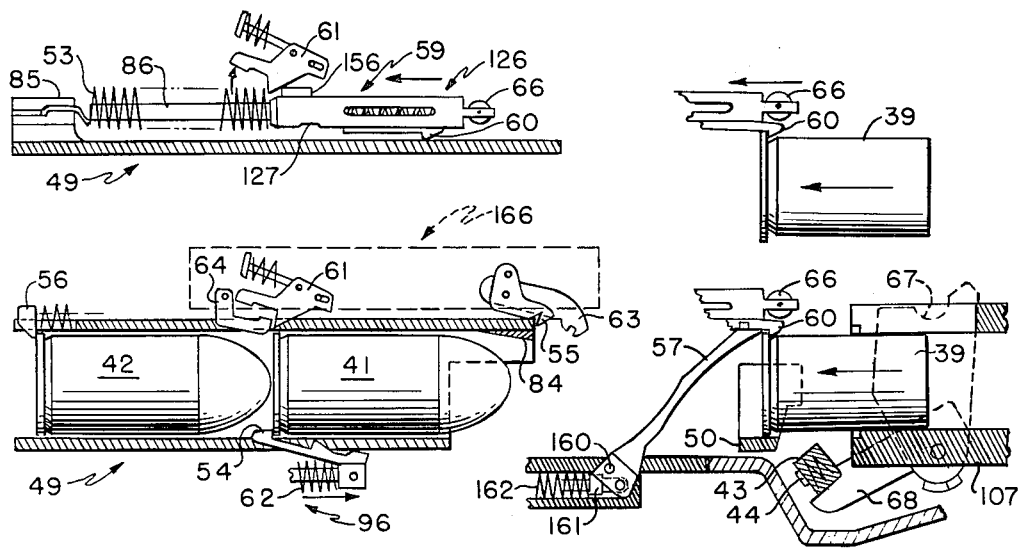
Figure 16:
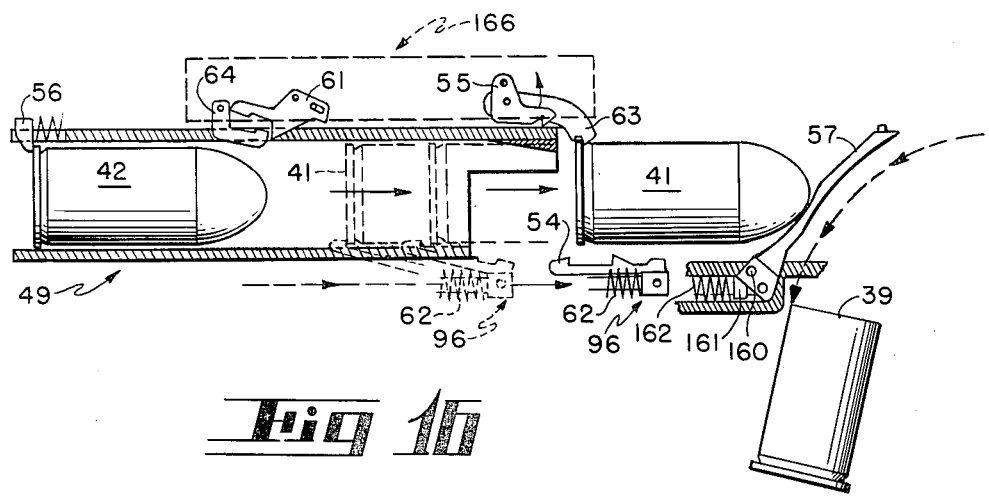

Eighth, the events now described relate to the rearward movement of the cam rod subassembly 59, which was freed by the releasing of the cam lock 58. The energy for the rearward movement of the cam rod group or subassembly 59 was stored in tension spring 53 as the bolt 49 moved to the rear. Speaking in broad terms, the rearward movement of the cam rod group first causes the lock bar 43 to be moved out of the way of the expended case 39 and then causes the expended cartridge case 39 to be extracted and disposed of. Specifically, the cam rod group 59, acting via a cam plate 67, cams down the lock bar 43 over a stroke of approximately 1.2 inches (FIG. 14). More specifically, as the cam rod group 59 begins to move toward the rear under the force of tension spring 53, a roller 66 mounted on the front of the cam rod, acting through a cam plate 67, causes the locking bar 43 to drop downwardly (counterclockwise, FIG. 14) out of the rearward path of the case 39. The extractor 60 dwells during this stroke until the expended case 39 is unlocked. As the cam rod continues to move to the rear, extractor 60 draws the expended case 39 rearwardly so that the case is compelled to strike gate 57 and to drop out of the weapon (FIGS. 15 and 16). The case 39 is substantially discharged from the ejection opening when events effecting the placement of round 41 in battery position are initiated.

The discussion now relates to the initiation of the feed of Round No. 2 by reason of the disengagement of the decel latch 61.

Ninth, the cam rod group 59 continues to move to the rear (FIG. 3) and disengages the decel latch 61 from the base of round 41 (FIG. 15), freeing round 41, whereupon the feed spring 62, compressed by reason of the rearward movement of the bolt 49, and acting by means of the round feed latch 54, accelerates and pushes round 41 forwardly through bolt 49 until the round latch 63 engages the rim of its base (FIG. 16). Round 41 is restrained for a moment by round latch 63 as it unlocks bolt latch 55. As round 41 moves forwardly, it expends some of its energy in pulling the round latch 63 forwardly. The round latch 63 cams the bolt latch 55 upwardly, releasing bolt 49. FIG. 16 shows the base of round 41 just after it has caused to be opened the bolt latch 55. It is noted that the bolt lock 55 is positively opened by the kinetic energy of round 41 (FIG. 16). At this point on the cycle, round 41 is now in front of the bolt 49 and the bolt is free to move forward and chamber round 41. At this point it is reiterated that, due to the potential energy of spring 62, sufficient energy has been imparted to the round 41 to place it in front of the bolt 49, which the round causes to be unlocked.

The bolt 49, driven by springs 51 and 52, moves forwardly, it being understood that round 41 has disengaged itself from the round latch 63 and cams outwardly the gate 57, which serves as a guide for round 41 as it passes forwardly. As the bolt 49 moves forwardly, it picks up the cam rod sub-assembly 59 and drives it forwardly (FIG. 17). Additionally, the bolt, acting through round advance pawl 56, advances round 42 forwardly from the rear station to the intermediate station until the decel latch 61 engages the base of round 42 (FIGS. 17 and 18). The round advance pawl 56 is cammed out of engagement with the base of round 42 by reason of the deceleration of round 42 as it is arrested by the decel latch 61.

Parenthetically, in approaching engagement by the decel latch 61, round 42 strikes a lifting cam 64, the purpose of which is to lift or to rotate the decel latch 61 slightly clockwise, thereby to place the latching surface 65 of the decel latch at a level (FIG. 17) whereat it is in front of the vertically projecting rim of round 42, but whereat it is sufficiently above the case of the round to assure that the surface 65 will clear the case but will engage the rim of round 42 (FIG. 18). Once round 41 is in front of the bolt and the bolt is unlocked, the bolt continues to chamber round 41 with the aid of the pusher 84, which has a surface parallel to the front surface of the bolt, the bolt being driven forwardly by its main springs 51 and 52. Parenthetically, it should be noted that the feed latch 54 stroke suffices to place round 41 in front of the bolt 49. However, the feed latch does not have a sufficiently long forward stroke to chamber the round.

Tenth, the cam rod initiates the operation of a mechanism, described below, which causes the locking bar 43 to be moved into its upper or locked position. Specifically, a roller 66 on the front of the cam bar group 59 moves a cam plate 67 clockwise, putting tension on a spring disposed between the cam plate and a lock bar follower 68. As the cam plate 67 moves clockwise, it unlocks the lock bar follower 68 (which was previously locked down by element 150 shown in FIG. 17 in order to allow round 41 to chamber), and the lock bar follower 68 causes the lock bar 43 to snap into place behind the cartridge case for round 41. The timing is such that the lock bar 43 snaps into place once round 41 is sufficiently chambered.

The searing mechanism in the hammer housing is essentially a double hook. Therefore, after a burst the hammer 47 is held on the upper sear until the trigger is released (FIG. 6). Thereafter the trigger bar 45 will normally be released and the hammer 47 drops down on the lower sear 46 (FIG. 7).

*The bolt*

The description of the construction of bolt 49 follows the pattern of its functions, beginning at the instant when the bolt is latched in its rearmost position and assuming that the round 40 has just been fired.

It has been previously pointed out that one function of the bolt, which will arbitrarily be designated the first one, is to carry round 42 forward from the rear station to the intermediate station, and reference is now made to FIGS. 22, 23, 24, and 25 in describing the means carried by the bolt for accomplishing this function. The bolt is machined at its rear to provide a circular bore 69 and a small chamber 70 and a shoulder 71 against which a cam block 72 abuts. The cam block comprises a top and two sides 73 and 74, each formed with a generally U-shaped groove such as that numbered 75. In the grooves 75 there rides, guided by the grooves, a pin 76, integral with round advance pawl 56. Projecting forwardly from the round advance pawl 56 is a slender rod 77, which project sthrough a retainer 78 and terminates in an enlarged stop portion 79, the latter being disposed in chamber 69. Compression spring 81 abuts against stop portion 79. The round advance pawl 56 is mounted for two degrees of controlled displacement. The description now assumes that pawl 56 is in engagement with the back of the rim of round 42, and that the bolt 49 begins to go forward. At this point in the cycle the pin 76 which positions the pawl 56 vertically is in the low portion of grooves 75. As the bolt goes forward, and assuming sufficient preload in spring 80, the bolt 49 will drag the round forwardly. The preload in spring 80 will keep the pin 76 from slipping upwardly into the rear part of the grooves 75. Spring 80 is a compression spring disposed in chamber 70 and thrusting retainer 78 forwardly into a shoulder.

After round 42 contacts the lifting cam 64 for the decel latch to position the decel latch so that the decel latch 61 engages the base of round 42, the pawl 56 is disengaged from round 42. The advance pawl 56 is cammed out of position by reason of the deceleration of round 42 and the fact that the increased drag on pawl 56 lifts pin 76 upwardly into the rear and upper portion of the grooves 75. This is accompanied by further compression of the load spring 80. As the bolt continues to move forward, the spring 80 simply pulls the pin 76 back to its central position in the grooves 75.

As the bolt is again retracted, pawl 56 simply passes over the rim of the round that is in the intermediate station without catching on it. The smaller return spring 81 permits the pin 76 to be driven into the front portion of the grooves 75, so that the pawl 56 simply slips over the rim of that round.

Now, returning to the pattern of functions followed in this section of the description, forward motion of the bolt is again assumed. The second function of the bolt is to drive round 41 into battery position. The performance of this function is preceded by several events, to wit: the decel latch 61 has been released from the base of round 41, permitting the sliding feed latch 54 to drive round 41 through the bolt so that the round 41 impacts the round latch 63 and causes bolt latch 55 to be lifted out of engagement with the bolt. In fact, all of these last-recited events occurred before the bolt moved forwardly to advance round 42. The situation being described, then, is as depicted in FIGS. 16, 17, and 18, round 41 being in front of the bolt. Pivotally mounted near the front of the bolt, on a suitable pin 83 (FIGS. 3 and 4), is a pusher member 84, shown in outline in FIGS. 17 and 18, the pusher member being biased by a spring (which need not be shown herein) in such fashion that the forward end of the pusher 84 exerts thrust against the base of round 41 to chamber that round (FIGS. 17 and 18), and further in such manner that the front end of the pusher disappears into and conforms with the interior surface of the bolt as the bolt retracts. The function of the pusher is to aid the bolt in driving the round to be fired into battery position or chamber.

The third function performed by the bolt is picking up the cam rod 59 and driving it forwardly so that the cam rod can cause the locking bar 43 to move into its locked position behind the now chambered round 41. Accordingly, there is formed on the bolt, or otherwise secured thereto, a lug 85 which is adapted to drive portion 86 of the cam rod subassembly forwardly. The rear end of cam rod tension spring 53 is connected to lug 85 (FIGS. 17 and 18).

The fourth function performed by the bolt is this: after round 41 is fired, the bolt receives an impulse from the sleeve 50 and begins its retract stroke. To this end, as best shown in FIG. 3, the fore portion of the bolt 49 is suitably formed tightly to interfit with sleeve 50 when the bolt is in battery position.

The fifth function performed by the bolt is, when retracting, to reset the hammer 47 in its clockwise position when the weapon is fired. It will be understood, therefore, that the bolt is suitably formed with a slot 87 (FIGS. 11 and 12) having a forward shoulder 88 which resets the hammer.

Sixth, during the retraction stroke the bolt compresses springs 51 and 52 in order to store the energy which is later utilized to drive the bolt forwardly. Accordingly, the bolt is provided with lugs 89 and 90 (FIG. 3), which lugs are secured to the front ends of springs 51 and 52, respectively. The spring 52 is contained within a tube 91 immediately aft of lug 90, and formed as a lateral wing on the side of the bolt. This tube 91 is formed reciprocally to slide within cylindrical portion 92 of the housing (FIG. 30) as the bolt advances and retracts. The spring 51 is mounted within cylindrical portion 93 of the housing, and the spring 53 is mounted within cylindrical portion 94, as shown in FIG. 30. It will be understood that the rear ends of the springs 51 and 52 are suitably fixed relative to the housing by means which need not be shown herein.

Figure 26:
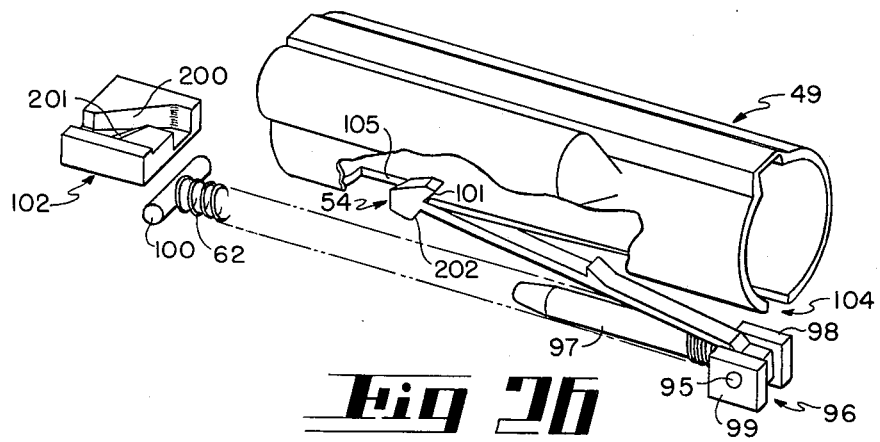
FIGS. 26, 27, and 28 are perspective views of the bolt and the round feeding mechanism during the following phases of operation, respectively: pick up of round feed latch by bolt, initiation of placement of round feed latch behind round, and completion of placement of round feed latch behind base of round.

Attention is now invited to the seventh function performed by the bolt, and reference is now made generally to FIG. 4 and specifically to FIGS. 26, 27, and 28. The head-shaped end of the latch element 54 is free—that is, the latch 54 is mounted in cantilever fashion by pivotally securing it on a stub shaft 95 which is journaled on a slider 96. Slider 96 comprises a rod 97 which terminates in bifurcations 98 and 99. Concentrically disposed in relation to the rod 97 and secured at its outer end to slider 96 and at its inner end to an anchor member 100 is the feed spring 62.

Bolt 49 is suitably formed with cut-out cam surfaces for guiding the latch member 54. For example, as the bolt retracts, a transversely cut shoulder 101 engages the free or head-shaped end of latch member 54 (i.e., the end formed with pawl and cam surfaces), whereby the latch member is drawn rearwardly, compressing spring 62. This motion continues until the lower part of the head of latch member 54 contacts a cam box 102 which is formed with cam surfaces 200 and 201. Part 54 is pulled rearward by bolt surface 101 (FIG. 27). Part 54 is cammed to the side by surface 200 on 102. This camming action releases 54 from surface 101 on the bolt 49. Since spring 62 is now compressed, part 54 is biased forward. In moving forward it is cammed upward by surface 202 of 54 and surface 201 of 102. It now comes into contact with the base of round 41 (FIG. 28). The bolt and surface 101 continue to the rear, the side 103 of slot 104 sliding past the side of the free end of latch 54.

As described previously, latch 54 remains in engagement with round 41 while the bolt continues to go rearwardly, the round 41 being restrained against forward movement by decel latch 61 (FIG. 14). When the decel latch is opened, the compression of spring 62 causes the slider 96 and the round feed latch 54 to move forward rapidly, the feed latch being free to slide within slot 104 (FIGS. 15 and 16). As round 41 is accelerated and passes forwardly out of the bolt, the bolt moves forwardly after being unlocked and then the slot 104 moves relative to the latch 54 (FIGS. 16, 17, and 18). When the bolt approaches battery position, the enlarged portion 105 of slot 104 slides past the head end of latch 54 allowing the head end of 54 to be in position to re-engage surface 101 the next time bolt 49 moves rearward.

Making reference now to FIG. 31, there is provided a slide 106 within which the slider 96 moves.

The description of the seventh function began by indicating that the bolt 49 is retracted to "park" the feed latch 54 behind round 41 (FIGS. 13 and 14).

The eighth function performed by the bolt is that it stretches tension spring 53 to supply the energy to drive the cam rod subassembly 59.

The ninth function performed by the bolt is that, during its retract stroke, it clears the extractor gate 57 to permit it to swing transversely (see FIGS. 1, 3, and 14).

The tenth function performed by the bolt resides in the fact that it is formed as a tunnel—i.e., with a round traversal passage along its entire length, through which tunnel the successive rounds pass as they move toward the firing chamber.

At this point certain definitions may be helpful, even if repetitious. The Round No. 1 position is the position occupied by ammunition in the firing chamber (see 40, FIG. 11). The Round No. 2 position is that occupied by ammunition the base of which is enegaged by the decel latch 61 (see 41, FIG. 12). The Round No. 3 position is the rear position occupied by ammunition aft of the decel latch but in position to be engaged by the round advance pawl 56 (see element 42, FIG. 14).

If one were to look from the barrel 107 end toward the front of the bolt, such an observer would see the lug 89 (FIG. 3) slightly clockwise of the 3 o'clock position, the lug 85 slightly clockwise of the 1:30 o'clock position, the pusher 84 at approximately the 10:30 o'clock position, and the lug 90 at approximately the 9 o'clock position.

As shown in FIGS. 1 and 3, the bolt 49 carries a knurled knob 108 which may be employed manually to retract the bolt, when desired. As a safety feature, the knob 108 may be rotated 180 degrees. In so doing, the lip 204 on knob 108 (FIG. 1) is positioned forward; therefore the bolt will not close completely, thus blocking the hammer and preventing the hammer from falling. To rotate the knob 108 by 180 degrees, it is necessary only to lift the knob slightly so that the lip 204 clears the housing, then to twist. If the bolt and knob are forward (in opening 203), the same is true. When the bolt and knob are forward, and the knob is in the safe position (lip 204 forward in opening 203) and the trigger is accidentially pulled, nothing will happen. Since the bolt is blocking the hammer 47, the hammer is also raised slightly, enough to keep surface 115 (FIGS. 5 and 8) above the surface 114 of the lower sear 46.

*The trigger and hammer mechanism*

Reference is made to FIGS. 5–8 in the description of the trigger and hammer mechanism. It comprises a trigger bar 45; a lower sear 46, integral with the trigger bar; a hammer 47; and an upper sear 48. The function of the hammer 47 is to swing counter-clockwise into the position illustrated in FIG. 8 in order to impact the firing pin 44 and percussively to fire the round in chamber position, at the will of the operator.

The weapon is a semi-automatic weapon, and the function of the upper sear 48 is to engage and hold the hammer 47 when the hammer is restored to its clockwise position (FIG. 6) by reason of impact of the rearwardly moving bolt 49 on the hammer 47 (FIG. 12), assuming that the trigger 45 has not been released. When the trigger 45 is released, the hammer 47 slips out of engagement with the upper sear 48 and into engagement with the lower sear 46. This weapon is always fired "off the lower sear" when the trigger 45 is pulled. The position of engagement of the hammer with the lower sear 46 (i.e., the "ready to fire" position) is illustrated in FIGS. 7 and 11.

For reasons which need not be discussed herein, the trigger 45 is of unorthodox construction, consituting in essence a horizontal bar, integral with the lower sear 46, and a pair of spaced vertically extending lugs 109 and 110. Disposed between the end of cap 111 of the trigger housing 112 and the lug 109 is a compression spring 113 which biases the trigger bar 45 inwardly (i.e., toward the right, FIG. 5), thereby to supply the compression against which the trigger 45 is "pulled"—i.e., displaced to the left (FIG. 7).

The lower sear 46 depends from the trigger bar 45 and is formed with a latching surface 114 for engagement with latching surface 115 of the hammer.

When the lower sear 46 is in the advanced position illustrated in FIG. 7, it engages the hammer. When the weapon is fired by pulling the trigger, the lower sear is retracted and it disengages the hammer.

It will be understood by those of skill in the art that the sole purpose of the upper sear 48 is to engage the hammer when the hammer is returned to its clockwise (FIG. 6) position after firing, and to hold the hammer in engagement until the trigger is released. Accordingly, the upper sear 48 is formed with a depending hook or latching surface 116, suitably arranged and formed to engage latching surface 117 on the hammer at the end of firing, when the bolt restores the hammer 47 to its clockwise position as illustrated in FIG. 6. The upper sear is formed with a downwardly extending lug 118, and positioned between this lug and lug 110 on the trigger bar is a compression spring 119. When the trigger is released, compression spring 113 pushes lugs 109 and 118 to the right, disengaging the upper sear from the latching surface 117 of the hammer. At the same time latching surface 114 has moved to the right, so that latching surface 115 of the hammer then goes into engagement with the lower sear (FIG. 7). It will be noted that springs 113 and 119 push lugs 109 and 118 together.

The compression spring 119 causes the upper sear 48 to follow the lower sear 46 when the trigger 45 is pulled. This causes the upper sear 48 to intercept the path of the hammer 47 as the hammer is cammed back into clockwise position after firing. As the hammer contacts the upper sear, the upper sear is forced to the right, compressing spring 119. As the hammer swings clockwise high enough, the latch surface 116 engages the hammer due to the force of the spring 119 seeking to return the upper sear to its original position relative to the lower sear.

The hammer 47 comprises a main hammer portion as well as an integral bearing portion 120 rotatably mounted or journaled on a stub shaft 121. The bearing portion 120 is provided with an integral crank 122, to which is secured a thrust rod 123. One end of a compression spring 124 is restrained. This spring 124 is concentrically mounted with respect to thrust rod 123, and the other end bears on a mushroom portion 125 integral with the thrust rod, in such manner that, when the hammer disengages from the lower sear, the compression spring 124 is relieved, driving the hammer counter-clockwise against the firing pin 44 with great force. Conversely, when the bolt returns the hammer to its clockwise position, in order to engage the upper sear, this compression spring 124 is compressed, storing energy for the next firing movement of the hammer. The displacements of the upper and lower sears are essentially linear, and the motion of the hammer is rotary.

It is neither necessary nor desirable to show or discuss herein the details of the various conventional expedients such as sliding and limiting and arresting and stop formations utilized to secured the various springs and parts of this mechanism in assembly. All such expedients are well known to those of skill in the art.

*The cam rod assembly and associated parts*

Referring now to the cam rod 59, its structure is most easily explained by following a functional outline and assuming that round 40 has just been fired. The cam rod subassembly then performs these functions:

(1) When the cam rod lock 58 is disengaged from the cam rod subsassembly, the latter retracts (with the initial exception of extractor 60) under the force of tension spring 53 (see FIGS. 1 and 3);

(2) The cam rod subassembly, acting via roller 66, causes the locking bar 43 (see FIGS. 9, 10, 14, and 15) to be positioned in its counter-clockwise position;

(3) The cam rod subassembly, acting via the extractor 60 extracts the case 39 of the expended round (see FIGS. 3B and 15);

(4) The cam rod subassembly releases the decel latch 61 from the base of the round 41 at the intermediate station (FIG. 15);

(5) After being picked up by lug 85 on bolt 49 during the forward stroke of the bolt, the cam rod subassembly 59 advances to cause the lock bar 43 to assume its case-locking position, as illustrated in FIG. 3; see also FIGS. 17 and 18.

The main cam rod member comprises a generally cylindrical body 126 which is made with a number of formations. One of these is a transverse depression 127 (FIG. 18), which depression is engaged by the cam lock 58. Another is a linear axially extending slot 128 in which the roller 66 is mounted (see FIG. 9). A third is an axially extending slot (not illustrated in detail, FIG. 3A) in which the extractor 60 slides. A fourth is a generally axially extending slot 129 in which there is slidably mounted the pin 130 on which the rear end of the extractor 60 is pivoted (FIG. 3A). Slot 129 opens out to each side of the body member 126, which is formed centrally as an axial bore in which an eccentric 131 is slidably mounted. The eccentric 131 is biased rearwardly (i.e., toward pin 130) by a compression spring 132, and there are formed on the face of the eccentric 131 and the extractor 60 cam surfaces whereby the eccentric tends to urge the extractor to swing to its clockwise position (i.e., the one illustrated in full lines in FIG. 3A). During the forward movement of the cam bar assembly, the latching surface 133 of the extractor 60 easily slips over the rim of the case of the round which is to be fired, and the action of spring 132 tends to maintain this relationship by urging element 60 clockwise (FIG. 3B).

It has been noted that, as the body 126 of the cam rod subassembly begins to retract (FIG. 14), the extractor dwells. This action compresses spring 132, the pivot pin 130 sliding along slot 129, and the body 126 sliding rearwardly relative to the extractor. At the end of this "dwelling" action, pin 130 approaches the right end of slot 129 and the shoulder on eccentric 131 abuts against stop 134 (FIG. 3B), so that, as the body 126 continues to retract, the extractor 60 also retracts and withdraws the expended case 39.

The body 126 is suitably formed with an axial depression at 135 to accept, with force fit, the cam rod extension 86. The cam rod spring 53 is disposed in concentric relation to the extension 86.

Figure 9:
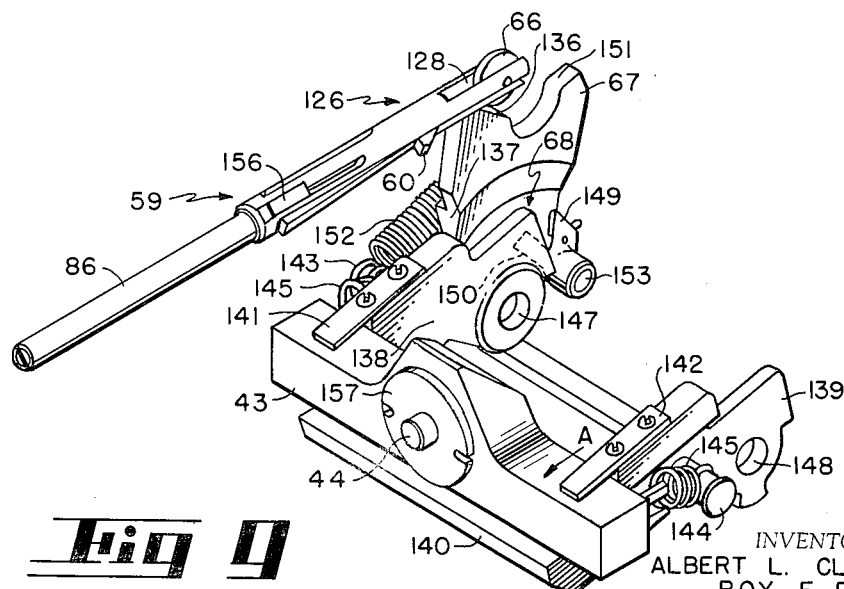
FIG. 9 is a perspective view of the locking bar mechanism.

Having covered the parts which perform the extraction function, the description now proceeds to the lock bar 43 (FIG. 3) and the means by which it is controlled as to position by the cam bar subassembly. The explanation will cover first the open or counter-clockwise position, in which the bar 43 is locked down out of the way of an expended case to be extracted (FIG. 14) or a new round to be chambered (FIG. 17). As the cam rod subassembly retracts, roller 66, acting on a cam surface 136 of a rotatably mounted upwardly projecting cam plate 67, causes that cam plate to rotate counter-clockwise (FIG. 9). Another cam surface 137 on the cam plate 67 abuts against a cam surface on lock bar follower 68, forcing lock bar follower 68 to its counter-clockwise position. The follower 68 is formed essentially as a tilting shelf with sides 138 and 139 and an integral table portion 140 on which the lock bar 43 is mounted for limited linear movement relative to the plane of the table. The lock bar 43 is restrained against displacement vertical with respect to the table by a pair of retainers 141 and 142, secured to sides 138 and 139, respectively. Projecting outwardly from the sides are posts 143 and 144. Each end of the lock bar 43 is secured to its corresponding post, as by a spring 145. This arrangement permits limited motion of the lock bar 43 in the direction indicated by the arrow A (FIG. 9) in response to the forces of firing, whereupon impact is conveyed from the expended shell case (such as 39) via the bar 43 to the impact sleeve 50 (FIG. 3). When the lock bar follower 68 reaches its counter-clockwise position, it is affirmatively locked in position by a pawl 149, which is provided with an arm 150. The arm 150 is so arranged with respect to a cooperating surface on side 138 as to maintain the lock bar follower 68 affirmatively in counter-clockwise position, unless and until this arm 150 is positively moved clockwise by the clockwise rotation of the cam plate 67. The arm 150 is a part of pawl 149, which is torsion-spring-biased into this counter-clockwise position (FIG. 17).

Now the discussion proceeds to the arrangements by which the locking bar 43 is placed in its clockwise position, as illustrated in FIG. 9, whereat it is disposed immediately behind the case of a round to be fired. As the bolt chambers the round to be fired, the cam rod group 59 is moving forwardly, so that roller 66 (FIG. 9) abuts against the cam surface 151 and turns cam plate 67 clockwise, moving pawl 149 clockwise and also moving arm 150 clockwise and therefore unlocking the lock bar follower 68. This clockwise motion of the cam plate 67 stretches spring 152, connected between side 138 and plate 67 (see FIGS. 9 and 18). As the cam rod approaches its forward position and as roller 66 moves across surface 151, the cam plate 67 causes pawl 149 to rotate clockwise, unlocking the lock bar follower 68. The spring 152 rapidly pulls the lock bar follower 68 into its clockwise position.

Figure 10:
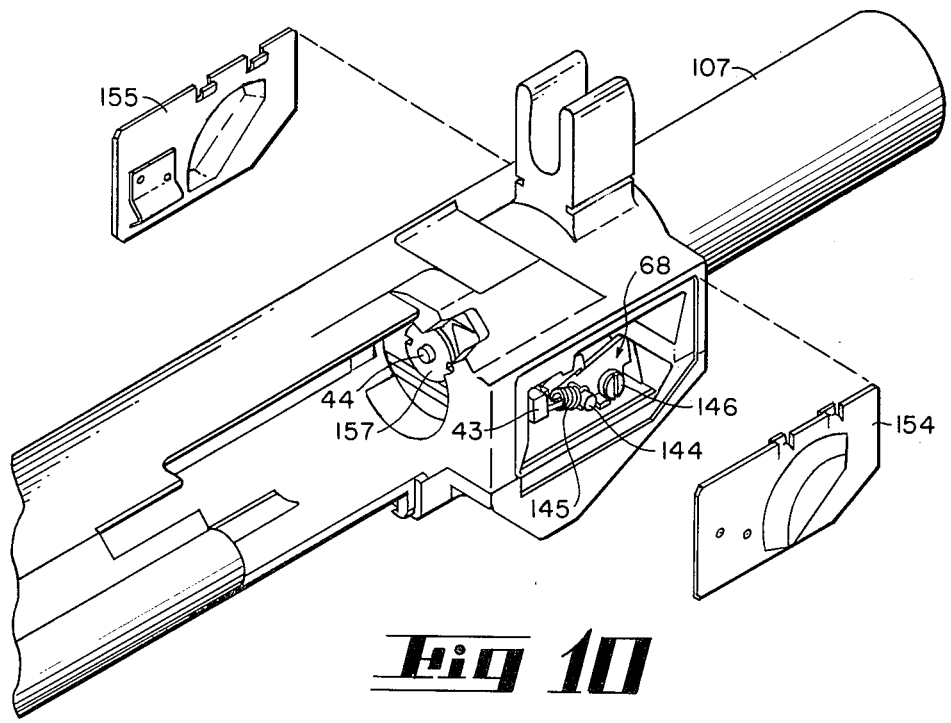
FIG. 10 is a perspective view of the housing, showing the location of the firing pin and locking bar assembly.

As best seen in FIGS. 3 and 9, the pawl 149 is suitably pivoted at 153, and the fore portion of the housing is machined and arranged to provide support for the bearing 153. Access to the sides of the lock bar and associated elements is provided by removable closure members 154 and 155 (FIG. 10).

It was previously indicated that the cam bar subassembly 59 controlled the opening of the decel latch 61. This is accomplished by a suitably shaped land 156 (FIG. 9) secured on the body member 126 of the cam rod subassembly, the action being as shown in the upper portion of FIG. 15, the land sweeping as a cam past a suitable surface on decel latch 61 to release the latter from the round.

The firing pin 44 is mounted in a suitable retainer 157 (FIG. 9) centrally located on the lock bar 43.

Referring now to the cam rod lock 58, best shown in FIGS. 1 and 3, it is swingably mounted at 158. When struck by the end of gate 57, the locking device 58 swings clockwise (FIG. 14) and frees the cam rod body 126 so that the cam rod subassembly is drawn to the rear by tension spring 53. A leaf spring 159 (FIG. 3) tends to maintain the cam rod lock 58 in locking position, and such position is again assumed when the cam rod subassembly again fully advances. Swinging gate 57 is pivotally mounted at 160 (FIG. 3) and is urged into its inward position (FIG. 15) by an eccentrically positioned rod 161 and compression spring 162 (as shown in FIG. 3). For purposes of loading additional rounds of ammunition, the aft portion of the underside of the framework of the weapon is shaped in muffler-like or elliptical configuration and hingedly mounted at 164 (FIG. 1) after the fashion of a gate. This aft portion is designated by the reference numeral 163, illustrated in FIG. 29, and referred to as the "loading gate." It is swung open to permit loading of ammunition in the weapon, and it is closed before firing.

The loading gate 163 is locked closed by two spring catches (not shown) located inside the loading gate in the area of the recess 205. Each spring has attached to it a button 206 (FIGS. 1 and 29). To open the loading gate, the two buttons (one on each side) are depressed, thus unlatching the springs. The accidental hitting of only one button will not release the loading gate. Both buttons (springs) must be depressed simultaneously. The loading gate is closed by simply pushing it up.

The loading gate is used primarily for the loading of ammunition. A new round may be inserted into the No. 3 position even after only one shot has been fired. Assuming two shots have been fired, so that the last of the full load of rounds previously supplied is now in the chamber and two additional rounds are to be loaded, the discussion now relates to the process by which two additional rounds are loaded. Because of the positions that these two rounds will occupy, they will be referred to in the remainder of this paragraph as the "No. 2 round" and the "next round." The gate is opened and a round is inserted—pushed upward and forward, probably with the thumb, until it stops against the decel latch 61. The loading gate is so positioned that the case lip of the No. 2 round rests on surfaces 207 of the gate (FIG. 29). That is, when the gate is opened surfaces 207 raise up (on a radius of pin 164, FIG. 1) to provide a lower support of the No. 2 round being inserted. The next round is merely laid into the loading gate, and the gate closed.

When the loading gate is opened, the rod 191 is pulled slightly, which in turn pulls the bolt by means of hook 192. This creates the same safeing effect as described above with regard to the knob 108, as the hammer is blocked by the bolt and the weapon cannot be fired.

*The decel latch housing and contents*

The housing 166 (FIGS. 19–21) has suitable formations (not shown) to make provision for the following:

(1) Two screw holes for mounting of a leaf spring 167 which urges the bolt latch 55 into latching position;

(2) Security for the pin 168 on which the bolt latch 55 is mounted;

(3) Security for the pin 169 on which the decel latch 61 is mounted;

(4) Security for the pivot pin 170 on which the lifting cam 64 is mounted;

(5) A rivet hole to complet the mounting for a leaf spring 171 which urges the lifting cam 64 into lifting position;

(6) A wall 172 against which spring 173 presses.

Note is made in passing of a generally double-L shaped manually operative bolt release device 174 which projects upwardly through the housing, is mounted on shaft 168, and is provided with a bearing surface in abutment with lug 175, such that when device 174 is manually moved counter-clockwise the force exerted against lug 175 moves the bolt latch 55 counter-clockwise and releases the bolt latch from the bolt 49.

The bolt latch 55 is generally L-shaped in contour, and it comprises two generally spaced sides 176 and 177, each having a vertically extending portion and a horizontally extending portion terminating in a hook or latch formation 178, as shown. The sides 176 and 177 may be integrated or secured together to form a bight at those portions of their lower margins immediately below lug 175. Lug 175 is rigidly secured to suitable apertures in the bolt latch 55. The bolt latch is pivoted on shaft 168. The operation of the bolt latch has been described above. It may be lifted manually by device 174, as desired. In ordinary operation of the gun the bolt latch is lifted or released from the round at the intermediate station by reason of the action of the round latch 63, which turns counter-clockwise, lifting upwardly the pin 179 on the bolt latch and causing the bolt latch 55 to turn counter-clockwise, releasing the round which the bolt latch previously restrained.

The construction of the decel latch lifting cam 64 is straightforward, it being a simple L-shaped cam pivoted at 170 and provided with a lifting face which turns the decel latch 61 clockwise into round-releasing position, as described above. Decel latch 61 is pivoted on pin 169, limited linear displacement of the decel latch being provided for by a slot 180 through which the pin 169 projects. A thrust rod 181 is eccentrically connected to the decel latch at 182 and biased outwardly by a compression spring 173, in such manner as to accomplish the following objectives:

(1) Normally to urge the latching surface 65 of the decel latch into engagement with the rim of the round under restraint;

(2) To provide shock absorbing action as a newly advanced round is engaged by latch 61.

Referring now to the round latch 63, it is provided with a pin 184 to which is secured means for biasing the free end of the latch 63 downward, as will later be described. The round latch is provided with a round rim-engaging surface 185 and a pin-lifting surface 186.

Note is made that the orientation of the lifting surface 186 and the displacement of slot 187 (formed in round latch 63) relative to pin 175 are such that, as the round drags the round latch 63 slightly forwardly against the force of spring 188, this spring being between a shoulder on the round latch and the bight formed by sides 176 and 177, the cam surface 186 on the round latch, acting on pin 179, lifts the bolt latch 55 upwardly, releasing the bolt. At this point note is made of the fact that pin 175 is secured through both sides 177 and 176 of the bolt latch 55 and provides a pivot on which the round latch 63 is mounted, the slot 187 providing angular displacement as well as limited linear displacement of round latch 63.

The depending end of round latch 63 is normally urged downwardly by a compression spring 198, which exerts force against a clevis 189, secured to the round latch at 184.

The decel latch housing and contents are located relative to the bolt as illustrated in FIGS. 1 and 2, and the bolt is suitably apertured and formed to provide for the operation of the decel latch, the round latch, the bolt latch, and the decel lifter cam, all as described in connection with the description of FIGS. 11–18 above.

*Safety feature*

When the loading gate 163 (FIG. 29) is pivoted counter-clockwise on shaft 164 (FIG. 1) to open the housing for loading, it is desired to disable the hammer by presenting to the hammer a closed port of the bolt side wall rather than the opening 87 (FIG. 11) provided for normal operation. Accordingly, there is pivotally secured to the loading gate at 190 a safeing rod 191 which extends along the bottom of the outside of the bolt and has a frontal hook portion 192 which emerges immediately adjacent the lower front wall of the bolt. When the loading gate turns counter-clockwise, the bolt is automatically retracted slightly to the extent required effectively to disable the hammer.

While there has been shown and described what is at present considered to be the preferred embodiment of the invention, it will be obvious to those skilled in the art that various modifications and changes may be made therein without departing from the scope of the invention as defined by the appended claims.

We claim:

1. In a weapon, the combination of:
a bolt having a round-traversal passage therethrough,
means for mounting the bolt for linear advance and retract movements,
elastic means energized by retraction of said bolt for feeding a round toward chamber as the bolt advances,
and means for locking said round in position within said bolt until the bolt has retracted by a predetermined amount.

2. In a weapon, the combination of:
a bolt having a round-traversal passage therethrough;
means for mounting the bolt for linear advance and retract movements;
elastic means energized by retraction of said bolt for feeding a round toward chamber as the bolt advances, said means comprising a feed latch member having a latching surface adapted to be positioned against the base of said round as the bolt retracts, and said means further comprising an energy storage device connected between said feed latch member and a fixed point;
and means for locking said round in position within said bolt until the bolt has retracted by a predetermined amount.

3. In a weapon, the combination of:
a bolt having a round-traversal passage therethrough,
and means activated by said bolt for feeding a round toward chamber, said means comprising:
a slidable feed latch member normally positioned ahead of the base of a round to be fed,
and spring means connected between said feed latch member and a fixed point and stressed by rearward displacement of said feed latch member for storing energy,
said feed latch member having a latching surface adapted to be positioned against the base of said round as the bolt retracts.

4. In a weapon, the combination of:
a bolt having a round-traversal passage therethrough,
and means activated by said bolt for feeding a round toward chamber, said means comprising:
an axially slidable feed latch member normally positioned ahead of the base of a round to be fed and formed with a latching surface adapted to be positioned against the base of said round as the bolt retracts,
a spring connected between said latch member and a fixed point and adapted to be stressed by rearward displacement of said feed latch member for storing energy;
and a cam track;
the bolt being formed with guide surfaces including a pickup portion, in such manner that, as the bolt retracts, the pickup portion engages the feed latch member and drives it rearwardly until the feed latch member is cammed by the track into engagement with the base of said round, and further in such manner that, as the bolt continues to retract, it departs from the feed latch member and leaves the feed latch member in engagement with said round.

5. In a weapon, the combination of:
a bolt having a round-traversal passage therethrough;
a slidable feed latch member normally positioned ahead of the base of a round to be fed;
spring means connected between said feed latch member and a fixed point and stressed by rearward displacement of said feed latch member for storing energy;
said feed latch member having a latching surface adapted to be positioned against the base of said round as the bolt retracts, in such manner that the stressed spring means exerts a strong forward force on the feed latch member and round while said bolt continues to retract;
bolt-locking means for locking said bolt in retracted position;
releasable round-restraining means for restraining said round from forward movement until the bolt is locked, whereupon said round-restraining means is released to permit the round to be accelerated forward under the force of said spring means;

said bolt-locking means and round being so formed that the bolt is unlocked by the round as the round advances ahead of the bolt;

and energy-storage means for storing energy during the retraction of the bolt and expending the stored energy to advance the bolt, said bolt and round being so formed and arranged that, driven by the energy-storage means, the bolt, when unlocked, chambers said round.

6. In a weapon having a forward firing station and an intermediate station and a rear station, the combination of:

a bolt having a round-traversal passage therethrough, means activated by said bolt for feeding toward chamber a round poised at the intermediate station, and means carried by said bolt for advancing forwardly a round poised at the rear station.

7. In a weapon having a forward firing station and an intermediate station and a rear station, the combination of:

a bolt having a round-traversal passage therethrough;

means activated by said bolt for feeding toward chamber a round poised at the intermediate station, said means comprising a feeding member having a latching surface adapted to be positioned against the base of said round as the bolt retracts, said bolt continuing to retract while leaving said member so engaged;

and round-advancing means carried by said bolt for advancing forwardly a round poised at said rear station and comprising a round-advance pawl which engages the base of the round at the rear station when the bolt is fully retracted.

8. The combination in accordance with claim 7, and bolt-locking means for locking the bolt in retracted position.

9. The combination in accordance with claim 8, and releasable round-restraining means for restraining the round at the intermediate station against forward movement, the feeding means including a spring which compresses when the feeding member is drawn rearwardly by retraction of the bolt.

10. The combination in accordance with claim 9, and means for releasing said round-restraining means, the bolt-locking means and the round fed forwardly from the intermediate station being so arranged that said round unlocks the bolt-locking means as said round emerges from the bolt.

11. The combination in accordance with claim 10, and means for storing up energy during the retraction of the bolt and operative upon unlocking of the bolt to drive the bolt forward to chamber the round fed from the intermediate station and advance the trailing round from the rear station into engagement with said round-restraining means.

12. In a weapon having a firing station and an intermediate station and a rear station, the combination of:

a reciprocally movable bolt having a round-traversal passage therethrough;

feeding means positioned by retraction of the bolt for providing a driving force which, when not restrained, drives a round from the intermediate station through said bolt;

round-advancing means carried by the bolt and positioned by further retraction of the bolt for advancing a tandem-arranged round forwardly from the rear station when the bolt advances;

releasable bolt-locking means for locking the bolt in fully retracted position;

round-restraining means for restraining the first-mentioned round at the intermediate station;

and means for releasing the round-restraining means to permit the feeding means to drive said first-mentioned round forwardly through the bolt;

said bolt-locking means being so arranged and round contour being such that the round driven unlocks the bolts as it emerges from the bolt, whereupon the bolt advances the tandem round from the rear station to the intermediate station and into engagement with the round-restraining means while chambering the first-mentioned round.

13. The combination in accordance with claim 12, and means carried by the bolt for disengaging the round-advancing means from the base of the advanced round when said round engages the restraining means.

14. The combinataion in accordance with claim 13 in which the means for releasing the round-restraining means from the round to be fed from the intermediate station is a reciprocally movable rod, and releasable rod-locking means for holding the rod in its forward position when a round is in chamber.

15. The combination in accordance with claim 14, and swingably mounted case-locking means controlled by said rod and including a locking bar adapted to be positioned behind an already-chambered round at the firing station preparatory to firing and bolt retraction.

16. The combination in accordance with claim 15, and a rod driving spring stressed by retraction of said bolt.

17. The combination in accordance with claim 16 in which the rod driving spring is a tension spring.

18. The combination in accordance with claim 17, and bolt-position-sensing means for releasing said rod to permit it to be retracted by its spring, the rod activating the swingably mounted means to position the locking bar out of the path of the case of the fired round and releasing the round-restraining means from the round to be fed forwardly.

19. The combination in accordance with claim 18 wherein the bolt-position-sensing means comprises a biased gate which swings inboard to release the rod-locking means from the rod.

20. The combination in accordance with claim 19, and a case extractor carried by the rod for withdrawing the expended case of a fired round, said extractor being secured to the rod with limited restrained freedom of linear movement, whereby the rod retracts through a predetermined distance before the extractor retracts.

21. The combination in accordance with claim 20 in which the aforementioned gate deflects the extracted case outwardly to jettison it, and in which said gate is swung outboard by the round being fed from the intermediate station toward chamber.

22. An improved repeating weapon having first and intermediate and rear stations and comprising, in combination;

first, housing means formed to provide a frontal firing chamber or first station and a bore aft of said firing chamber portion and formed to receive a bolt and to define intermediate and rear stations;

second, a reciprocally movable bolt mounted within said bore, said bolt being internally formed to provide a round-traversal passage therethrough, said chamber being adapted to receive a first or leading round poised and chambered to be fired and said bolt and magazine being adapted to position, in tandem with said first round, and at the intermediate and rear stations, respectively, intermediate or second and trailing or third rounds poised to be fed and advanced, respectively;

third, swingably mounted case-locking means including a locking bar adapted to be positioned in registry with said firing chamber preparatory to firing and out of registry after firing;

fourth, a round-retaining latch adapted to engage the base of said second round at the intermediate position and to retain it in position poised to be fed;

fifth, a resettable trigger-and-hammer mechanism adapted to be activated percussively to fire said chambered round, whereupon said bolt receives an impulse from the locking bar which impels the bolt to retract rearwardly to reset the trigger-and-hammer mechanism;

sixth, a first energy-storage means stressed by retraction of said bolt for storing energy later employed for advancement of said bolt;

seventh, round-feeding means including a slidably mounted feed latch normally positioned ahead of the base of said second round, so located at said intermediate station, said bolt and round-feeding means being formed to drive said feed latch rearwardly and into engagement with the base of said second round as the bolt retracts and to leave the feed latch so engaged as the bolt further retracts;

eighth, a second energy-storage means stressed by retraction of said feed latch to store energy later expended for feeding said second round forwardly;

ninth, reciprocally mounted cam-rod means;

tenth, a third energy-storage means connected between said bolt and said cam-rod means and adapted to be stressed by retraction of said bolt to store energy for the retraction of said cam-rod means;

eleventh, expended-case discharge means including a gate located aft the firing chamber and biased and disposed to swing inwardly across the pathway of the expended case when the bolt retracts and clears the gate;

twelfth, releasable cam-rod locking means for locking the cam-rod means in forward position, said cam-lock means being opened by the inwardly swinging gate to free the cam-rod means for rearward movement, whereupon said cam-rod means actuates the swingably mounted case-locking means to position said locking bar out of the path of said expended case;

thirteenth, extractor means carried by said cam-rod means for pulling the expended case rearwardly after a predetermined retraction of said cam-rod means and while the cam-rod means continues to retract, until the expended case hits said gate and is deflected outwardly;

fourteenth, a round-advance pawl carried by the bolt for engagement with the base of said third round, so located at said rear station, substantially at the conclusion of the retraction of said bolt;

fifteenth, bolt-locking means for locking the bolt in retracted position;

said cam-rod means being formed to open said round-retaining latch to permit the second round to be released and to be fed forwardly through the bolt by said feed latch, due to the force of the second energy-storage means; and sixteenth, means actuated by said forwardly-fed second round for opening said bolt lock, whereupon said bolt is driven forwardly by said first energy-storage means to drive the second round into chambered position, said second round forcing said gate to swing outwardly as it approaches chambered position;

the advancing bolt, acting through the round-advance pawl, driving the third round into the intermediate-station position formerly occupied by the second round, whereat the base of the third round is engaged by said round-retaining latch, the bolt being further formed to advance the cam-rod means as the bolt advances, the cam-rod means advancing to activate the swingably-mounted case-locking means to position the locking bar behind the newly chambered round.

23. In a weapon having a housing formed to define a firing chamber, and an internal bore behind the chamber, the combination of:

a tunnel-shaped bolt reciprocally movable in said bore, and case-locking means swingably mounted in relation to the housing and including a locking element adapted to be selectively positioned either in a first position behind a chambered round to be fired or in a second position out of the path of the expended case of a fired round, said locking element imparting momentum to said bolt to drive the bolt rearwardly when a round is fired.

24. The combination in accordance with claim 23 in which a firing pin is disposed within said locking element.

25. The combination in accordance with claim 24 in which the swingably-mounted case-locking means further comprises:

a rocker-mounted cam having fore and aft positions;

a rotatably mounted follower on which the locking element is mounted, said follower having first and second positions corresponding to those of the locking element;

said rocker-mounted cam and follower having abutting surfaces so positioned that rotation of the cam to its aft position swings the follower to place the locking element in its second position;

releasable follower-locking means for locking the follower in its second position;

and a spring connected between said cam and said follower and adapted to be stressed when the cam is moved toward its fore position;

said cam and said follower being so arranged that when the cam fully attains its fore position the follower-locking means is released, whereupon the follower swings into its first position.

26. The combination in accordance with claim 25, rod means for rocking said cam, and releasable rod-locking means for holding said rod means in its forward position.

27. The combination in accordance with claim 26, and bolt-position-sensing means for determining when the bolt has retracted by a predetermined amount, said bolt-position-sensing means and rod-locking means being so formed and arranged that the rod-locking means is released to permit the rod means to retract rearwardly to rock the cam to its aft position and to control the swinging of the locking bar into its second position.

28. The combination in accordance with claim 27, and means powered by the bolt for retracting said rod means.

29. The combination in accordance with claim 28, and round-restraining means for poising a succeeding round to be fed, the round-restraining means and said rod means being so formed that the round-restraining means is released by the rod to permit feeding of said succeeding round on sufficient retraction of said rod means.

30. The combination in accordance with claim 29 in which the bolt and rod means are so formed that when the bolt advances it drives said rod means forwardly to rock said cam to its fore position and to control the swinging of the locking element into its first position.

31. In a weapon, the combination of:

a housing formed to define a firing chamber and an internal bore;

a bolt mounted for reciprocal movement within said bore;

compression spring means connected between the bolt and the housing for storing energy during bolt retraction, which energy is later expended to advance the bolt;

rod means;

releasable rod-locking means for holding said rod means in a forward position;

tension spring means connected between the bolt and the rod means for storing energy between bolt retraction, which energy is expended for retracting the rod means;

a case-locking element;

case-locking-element-positioning means controlled by said rod means and adapted selectively to position the locking element either in or out of registry with said chamber, said locking element being adapted to impart a rearwardly driving impulse to the bolt when the weapon is fired, whereupon the bolt retracts;

bolt-position-sensing means operative when the bolt has retracted by a predetermined amount to release the rod-locking means to permit the rod means to retract under the force of said tension means;

whereby the rod means positions the locking element out of registry with said chamber, said bolt stopping at the end of its retraction and then advancing, said bolt and rod means being formed to advance together so that the rod activates the locking-element-positioning means to register the locking element with said chamber.

32. The combination in accordance with claim 31 in which the bolt is formed with a round-traversal passage, and further including bolt-locking means for locking the bolt in retracted position, releasable round-restraining means for restraining a round within the bolt against feeding, said rod means being formed to release the round-restraining means to permit said round to be fed forwardly and said bolt-locking means being so formed as to be opened as the round is fed forwardly sufficiently to clear said bolt.

33. The combination in accordance with claim 31, and extractor means carried by said rod means.

34. The combination in accordance with claim 31 in which the bolt-position-sensing means comprises a gate mounted to swing inwardly as it is closed by the retracting bolt and in which the rod-locking means is adapted to be released by impact of said gate as the gate swings inwardly.

35. In ordnance, a mechanism for feeding tandem-arranged rounds of ammunition forwardly into a first station, comprising:

a reciprocally mounted hollow pusher element;

means for driving the pusher element rearwardly;

a releasable elastic feeding means adapted to be driven rearwardly by the pusher element and mechanically switched into engagement at a second station with a round to be fed, the pusher element continuing to retract rearwardly until it stops and reverses;

means for releasing the feeding means to permit said round to clear the front of said pusher element;

and elastance means strained by rearward displacement of the pusher element for driving the pusher element to push said round further forwardly.

36. A mechanism in accordance with claim 35 wherein the elastance means comprises two compression springs, one on each side of the pusher element.

37. A mechanism in accordance with claim 36 wherein the elastic feeding means includes another spring compressed by rearward displacement of the bolt.

References Cited by the Examiner

UNITED STATES PATENTS

| | | | |
|---|---|---|---|
| 681,481 | 8/01 | Johnson | 89—145 |
| 933,254 | 9/09 | Knous | 89—140 |

SAMUEL FEINBERG, *Primary Examiner.*

FRED C. MATTERN, JR., *Examiner.*

UNITED STATES PATENT OFFICE
CERTIFICATE OF CORRECTION

Patent No. 3,210,878　　　　　　　　　　　　　　　October 12, 1965

Albert L. Cleaver et al.

It is hereby certified that error appears in the above numbered patent requiring correction and that the said Letters Patent should read as corrected below.

Column 1, line 19, for "transfere" read -- transfer --; line 20, for "enegry" read -- energy --; line 64, for "pasage" read -- passage --; column 2, line 6, for "FIG." read -- FIGS. --; line 27, for "aranged" read -- arranged --; column 4, line 5, for "o fthe" read -- of the --; column 5, lines 32 and 33, for "decelration" read -- deceleration --; column 6, line 18, for "project sthrough" read -- projects through --; column 8, line 27, for "enegaged" read -- engaged --; column 9, line 5, for "consituting" read -- constituting --; line 73, for "secured" read -- secure --; column 12, line 50, for "complet" read -- complete --; column 15, line 54, for "and advance" read -- and to advance --; column 16, line 12, for "combinataion" read -- combination --; column 18, line 69, for "between" read -- during --.

Signed and sealed this 18th day of October 1966.

(SEAL)
Attest:

ERNEST W. SWIDER　　　　　　　　　　　　　　　　EDWARD J. Brenner
Attesting Officer　　　　　　　　　　　　　　　Commissioner of Patents

UNITED STATES PATENT OFFICE
CERTIFICATE OF CORRECTION

Patent No. 3,210,878                                  October 12, 1965

Albert L. Cleaver et al.

It is hereby certified that error appears in the above numbered patent requiring correction and that the said Letters Patent should read as corrected below.

Column 1, line 19, for "transfere" read -- transfer --; line 20, for "enegry" read -- energy --; line 64, for "pasage" read -- passage --; column 2, line 6, for "FIG." read -- FIGS. --; line 27, for "aranged" read -- arranged --; column 4, line 5, for "o fthe" read -- of the --; column 5, lines 32 and 33, for "decelration" read -- deceleration --; column 6, line 18, for "project sthrough" read -- projects through --; column 8, line 27, for "enegaged" read -- engaged --; column 9, line 5, for "consituting" read -- constituting --; line 73, for "secured" read -- secure --; column 12, line 50, for "complet" read -- complete --; column 15, line 54, for "and advance" read -- and to advance --; column 16, line 12, for "combinataion" read -- combination --; column 18, line 69, for "between" read -- during --.

Signed and sealed this 18th day of October 1966.

(SEAL)
Attest:

ERNEST W. SWIDER                              EDWARD J. Brenner
Attesting Officer                             Commissioner of Patents